(12) United States Patent
Cho et al.

(10) Patent No.: US 9,176,335 B2
(45) Date of Patent: Nov. 3, 2015

(54) DISPLAY PANEL AND DISPLAY APPARATUS HAVING A DISPLAY PANEL

(71) Applicant: SAMSUNG ELECTRONICS CO., LTD., Suwon-si (KR)

(72) Inventors: Byoung-jin Cho, Anyang-si (KR); Young-chol Lee, Hwaseong-si (KR); Nae-won Jang, Seongnam-si (KR); Hyeong-sik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 13/748,837

(22) Filed: Jan. 24, 2013

(65) Prior Publication Data
US 2013/0300955 A1    Nov. 14, 2013

(30) Foreign Application Priority Data
May 9, 2012    (KR) .................. 10-2012-0049357

(51) Int. Cl.
| | | |
|---|---|---|
| *G02F 1/1335* | (2006.01) | |
| *G02F 1/13* | (2006.01) | |
| *G02F 1/1347* | (2006.01) | |
| *H04N 13/04* | (2006.01) | |
| *G02B 27/26* | (2006.01) | |

(52) U.S. Cl.
CPC .............. *G02F 1/1313* (2013.01); *G02B 27/26* (2013.01); *G02F 1/1347* (2013.01); *H04N 13/0438* (2013.01)

(58) Field of Classification Search
CPC ............................ G02F 1/1313; G02F 1/1347
USPC .............. 349/15, 96, 77, 122; 345/5, 6, 419
See application file for complete search history.

(56) References Cited

U.S. PATENT DOCUMENTS

| | | | | |
|---|---|---|---|---|
| 2006/0146208 | A1* | 7/2006 | Kim ................................ | 349/15 |
| 2008/0246897 | A1* | 10/2008 | Gaudreau ....................... | 349/15 |
| 2010/0238097 | A1* | 9/2010 | Baik et al. ....................... | 345/87 |
| 2011/0043549 | A1* | 2/2011 | Chestakov et al. ............ | 345/690 |
| 2011/0248993 | A1* | 10/2011 | Xu ................................. | 345/419 |
| 2012/0038854 | A1* | 2/2012 | Inoue .............................. | 349/96 |
| 2012/0229720 | A1* | 9/2012 | Lee et al. ........................ | 349/15 |
| 2013/0009862 | A1* | 1/2013 | Chan et al. ..................... | 345/156 |
| 2013/0120675 | A1* | 5/2013 | Oh et al. ......................... | 349/15 |

* cited by examiner

*Primary Examiner* — Sang V Nguyen
(74) *Attorney, Agent, or Firm* — Sughrue Mion, PLLC

(57) ABSTRACT

A display panel, which realizes a 3D image in an active method, includes a first glass on which light is incident, a second glass which is aligned with the first glass and transmits an image, a first liquid crystal layer disposed between the first glass and the second glass and adjusts an amount of the light passing therethrough, and a second liquid crystal layer which is disposed between the second glass and the first liquid crystal layer and realizes the 3D image, wherein, in response to the display panel realizing the 3D image, the second liquid crystal layer is alternately arranged according to a first liquid crystal arrangement which corresponds to a first polarization direction and a second liquid crystal arrangement which corresponds to a second polarization direction which is different from the first polarization direction, so that images passing through the second liquid crystal layer are alternately polarized in the first polarization direction and the second polarization direction.

17 Claims, 7 Drawing Sheets

DISPLAY PANEL AND DISPLAY APPARATUS HAVING A DISPLAY PANEL

CROSS-REFERENCE TO RELATED APPLICATION

This application claims priority from Korean Patent Application No. 10-2012-0049357, filed on May 9, 2012 in the Korean Intellectual Property Office, the disclosure of which is incorporated herein by reference, in its entirety.

BACKGROUND

1. Field

Methods and apparatuses consistent with exemplary embodiments relate to a display panel and a display apparatus having a display panel. More particularly, the exemplary embodiments relate to a display panel which includes a liquid crystal layer which alternately polarize images in two different polarization directions in response to a 3-dimensional (3D) image being realized in an active method, and a display apparatus having the same.

2. Description of the Related Art

With the development of electronic technologies, various kinds of electronic apparatuses have been developed and distributed. In particular, various types of display apparatuses including a television, a mobile phone, a computer, and a personal digital assistant (PDA) are being widely used in general households.

As display apparatuses are increasingly used, user expectations for a wide variety of functions are also increasing. To meet the user's expectations, products equipped with new functions have appeared. In recent years, a display apparatus capable of realizing a 3D image has been in the spotlight.

A method of realizing a 3D image is largely divided into an active method and a passive method.

The active method uses shutter-type glasses and is called a shutter glasses method. In the active method, in response to a display apparatus outputting a left-eye image and a right-eye image alternately, shutter glasses alternately close a right shutter and a left shutter, thereby realizing a 3D image on the eyes of the user. That is, the active method allows the left eye of the user who wears the shutter glasses to view only the left-eye image and allows the right eye of the user to view only the right-eye image, so that the user can recognize the 3D image.

The passive method uses polarized glasses having different phases on a left glass and a right glass. In the passive method, in response to a display apparatus dividing an image on a horizontal line basis and outputting images having two phases which correspond to polarized glasses, a 3D image is realized by the eyes of the user wearing the polarized glasses.

Since the active method reproduces the left-eye image and the right-eye image in sequence, it is possible to realize a high-resolution 3D image. However, a frame rate greater than 120 Hz is required. Also, the shutter glasses are weighty and expensive, and the user's eyes get easily tired due to flickering produced by the shutter method.

The passive method uses polarized glasses that are light and inexpensive. However, dividing an image on a horizontal line basis may result in reduction in horizontal resolution and degradation of image quality.

Therefore, there is a demand for a method of maximizing advantages of the active method and the passive method in response to a 3D image being realized on a display apparatus.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display panel which allows a user to view a 3D image with polarized glasses when the 3D image is realized in an active method, and a display apparatus having the same.

According to an aspect of an exemplary embodiment, there is provided a display panel which realizes a 3D image in an active method, the display panel including: a first glass on which light is incident, a second glass which is aligned with the first glass and transmits an image, a first liquid crystal layer which is disposed between the first glass and the second glass and adjusts an amount of the light passing the first liquid crystal layer, and a second liquid crystal layer which is disposed between the second glass and the first liquid crystal layer and realizes the 3D image, wherein, in response to the display panel realizing the 3D image, the second liquid crystal layer is arranged according to a first liquid crystal arrangement which corresponds to a first polarization direction and a second liquid crystal arrangement which corresponds to a second polarization direction which is different from the first polarization direction, alternately, so that images passing through the second liquid crystal layer are alternately polarized in the first polarization direction and the second polarization direction.

The first polarization direction and the second polarization direction may be perpendicular to each other.

The first polarization direction may be a horizontal direction and the second polarization direction may be a vertical direction.

The first polarization direction may be a vertical direction and the second polarization direction may be a horizontal direction.

The first polarization direction may be an oblique direction and the second polarization direction may be an oblique direction which is perpendicular to the first polarization direction.

The display panel may further include a first TFT array which drives the first liquid crystal layer.

The display panel may further include a second TFT array which drives the second liquid crystal layer.

The display panel may further include a color filter which is disposed between the first liquid crystal layer and the second liquid crystal layer.

The display panel may further include: a first polarization plate which is disposed on a lower portion of the first glass, and a second polarization plate which is disposed between the second liquid crystal layer and the color filter.

A polarization axis of the first polarization plate and a polarization axis of the second polarization plate may be perpendicular to each other.

According to an aspect of another exemplary embodiment, there is provided a display apparatus including the above-described display panel.

According to various exemplary embodiments described above, the display apparatus realizing a 3D image in an active method can allow a user to view the 3D image through polarized glasses.

According to another exemplary embodiment, there is provided a display panel which realizes a 3D image, the display panel including: a first glass; a second glass which is aligned with the first glass; a first liquid crystal layer disposed between the first glass and the second glass; and a second liquid crystal layer disposed between the second glass and the first liquid crystal layer; wherein, the second liquid crystal layer is alternately arranged according to a first liquid crystal arrangement which corresponds to a first polarization direction and a second liquid crystal arrangement which corresponds to a second polarization direction different from the first polarization direction,

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
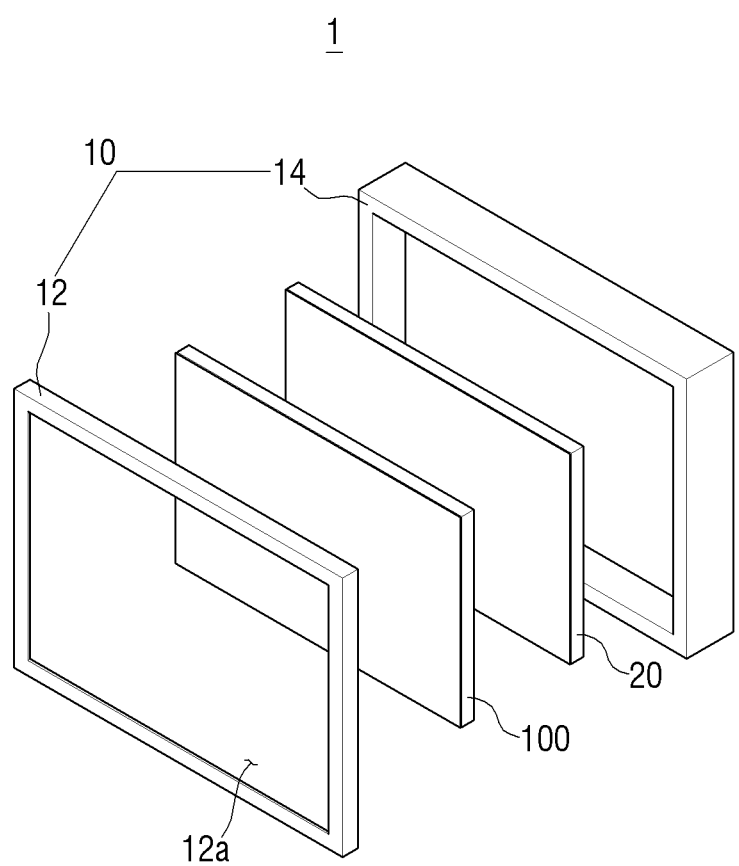
FIG. 1 is an exploded perspective view illustrating a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is an exploded perspective view schematically illustrating a display apparatus according to an exemplary embodiment.

Referring to FIG. 1, a display apparatus 1 includes a housing 10, a backlight unit 20, and a display panel 100.

The display apparatus 1 may be a liquid crystal display (LCD) television which is a flat panel display capable of realizing a 3D image in an active method. In an alternative exemplary embodiment, the display apparatus 1 may be other flat panel displays in response to the display apparatus being a television capable of realizing a 3D image in the active method. Also, the display apparatus 1 may be a computer monitor to which such a flat panel display is applied.

The housing 10 accommodates various parts of the display apparatus 1, such as the backlight unit 20, the display panel 100, a control board (not shown) which controls an operation of the display panel 100, and a power board (not shown) which supplies power to the display panel 100.

The housing 10 includes a front housing 12 and a rear housing 14 which are removably connected to each other. The front housing 12 forms a front border of the display apparatus 1 and has a rectangular opening 12a to allow an image to be exposed to the outside of the display apparatus. The rear housing 14 has an accommodating space formed therein to accommodate the aforementioned various parts.

The backlight unit 20 is a light source apparatus which emits light toward the display panel 100, and is disposed on a rear surface of the display panel 100 and supplies light of uniform brightness to an entire area of the display panel 100. The backlight unit 20 may be divided into a side type and a direct type according to a location of a light source. Since the backlight unit 20 in the present exemplary embodiment is a backlight unit well known in the related art, a detailed description thereof is omitted.

Figure 2:
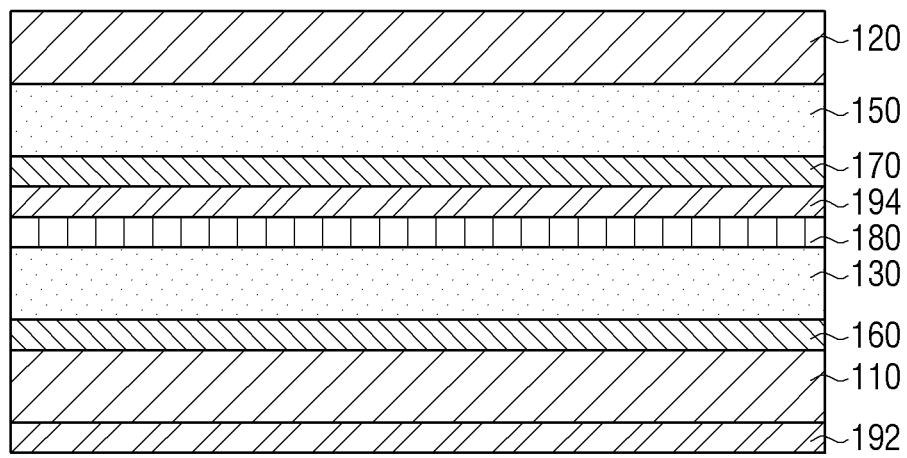
FIG. 2 is a schematic cross section view of a display panel provided in the display apparatus of FIG. 1.

FIG. 2 is a schematic cross section view of the display panel 100 provided in the display apparatus 1 of FIG. 1.

Referring to FIG. 2, the display panel 100 includes a first glass 110, a second glass 120, a first liquid crystal layer 130, a second liquid crystal layer 150, a first thin film transistor (TFT) array 160, a second TFT array 170, a color filter 180, a first polarization plate 192, and a second polarization plate 194.

The first glass 110 is made of transparent glass to allow light to pass therethrough. The light emitted from the backlight unit 20 of FIG. 1 enters the display panel 100 through the first glass 110. The first glass 110 also protects the first liquid crystal layer 130 and the second liquid crystal layer 150.

The second glass 120 is aligned with the first glass 110 in a vertical direction and is disposed on an upper portion of the display panel 100. The second glass 120 is made of transparent glass to allow light to pass therethrough like the first glass 110. An image output from the display panel 100 passes through the second glass 120 and is then displayed on an outside of the display apparatus 1 of FIG. 1. The second glass 120 also protects the first liquid crystal layer 130 and the second liquid crystal layer 150 like the first glass 110.

The first liquid crystal layer 130 is disposed between the first glass 110 and the second glass 120. Liquid crystal molecules, which are in an intermediate state between solid and liquid, are arranged in the first liquid crystal layer 130. The first liquid crystal layer 130 adjusts an amount of light passing along with the first polarization plate 192 and the second polarization plate 194 by changing the arrangement of the liquid crystal molecules. A method of adjusting an amount of light passing by the first liquid crystal layer 130, the first polarization plate 192 and the second polarization plate 194 is well known in the related art and thus a detailed description thereof is omitted.

The second liquid crystal layer 150 is disposed between the second glass 120 and the first liquid crystal layer 130. Like in the first liquid crystal layer 130, liquid crystal molecules, which are in an intermediate state between solid and liquid, are arranged in the second liquid crystal layer 150. The second liquid crystal layer 150 is operated only in response to a 3D image being realized and is not operated in response to a general 2D image being realized. The operation of the second liquid crystal layer 150 in response to a 3D image being realized will be explained in detail, below. In response to a general 2D image being realized, the image passes through the second liquid crystal layer 150 and is transmitted to the outside of the display panel 100, and is not affected by the second liquid crystal layer 150.

The first TFT array 160 is disposed between the first glass 110 and the first liquid crystal layer 130. The first TFT array 160 drives the first liquid crystal layer 130 by adjusting a voltage and adjusts the arrangement of the liquid crystal molecules.

The second TFT array 170 is disposed between the second liquid crystal layer 150 and the second polarization plate 194, which will be described later. The second TFT array 170 drives the second liquid crystal layer 130 only in response to a 3D image being realized, and adjusts the arrangement of the liquid crystal molecules by adjusting a voltage.

The color filter 180 is disposed between the first liquid crystal layer 130 and the second liquid crystal layer 150. More specifically, the color filter 180 is disposed between the first liquid crystal layer 130 and the second polarization plate 194, which will be described below. The color filter 180 consists consecutively of three primary colors, red (R), green (G), and blue (B). This is well known in the related art and thus a detailed description thereof is omitted. The color filter 180 realizes color of the light passing through the first liquid crystal layer 130, and the light passing through the color filter 180 forms an image having colors.

The first polarization plate 192 is disposed on a lower portion of the first glass 110 and is disposed on a bottommost portion of the display panel 100. The first polarization plate 192 allows only light of a specific direction, from among light emitted from the backlight unit 20 of FIG. 1, to be transmitted to the first liquid crystal layer 130.

The second polarization plate 194 is disposed between the second liquid crystal layer 150 and the color filter 180 and a polarization axis of the second polarization plate 194 is perpendicular to a polarization axis of the first polarization plate 192. For example, in response to the second polarization plate 194 being a vertical polarization plate, the first polarization plate 192 is a horizontal polarization plate. In response to the second polarization plate 194 being a horizontal polarization plate, the first polarization plate 192 is a vertical polarization plate. The second polarization plate 194 allows only an image of a specific direction, from among images passing through the color filter 180, to pass therethrough.

Figure 3:
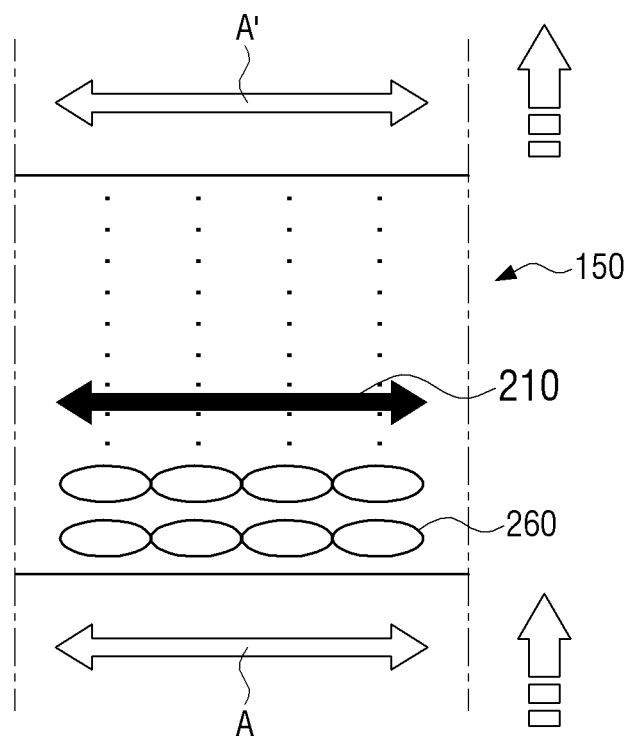
FIG. 3 is a view schematically illustrating polarization of an image in a second liquid crystal provided in the display panel of FIG. 2 according to a first polarization direction in response to a 3D image being realized.
Figure 4:
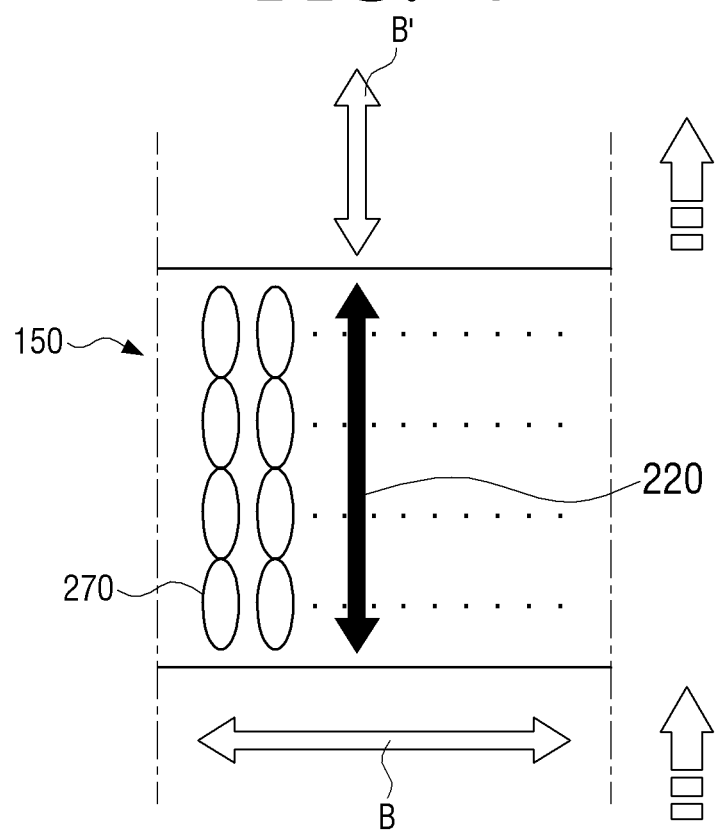
FIG. 4 is a view schematically illustrating polarization of an image in the second liquid crystal provided in the display panel of FIG. 2 according to a second polarization direction in response to a 3D image being realized.

FIG. 3 is a view schematically illustrating polarization of an image in a second liquid crystal provided in the display panel of FIG. 2 according to a first polarization direction in response to a 3D image being realized, and FIG. 4 is a view which schematically illustrates polarization of an image in the second liquid crystal provided in the display panel of FIG. 2 according to a second polarization direction in response to a 3D image being realized.

Referring to FIGS. 3 and 4, images of a specific direction passing through the second polarization plate 194 of FIG. 2 are alternately polarized in two different polarization directions by the second liquid crystal layer 150 in response to a 3D image being realized. The two polarization directions are perpendicular to each other.

Hereinafter, a forming process of images polarized through the second liquid crystal layer 150 will be explained in detail. For reference, the arrow displays on upper and lower portions on the right of the drawings indicate an advancing direction of an image. First and second liquid crystal arrangements 260 and 270 in the second liquid crystal layer 150 are illustrated conceptually for the sake of explanation and may be different from actual liquid crystal arrangement of an actual liquid crystal layer.

Referring to FIG. 3, in response to a first image (A) passing through the second liquid crystal layer 150, the second liquid crystal layer 150 has the first liquid crystal arrangement 260 so that the first image A is polarized in a first polarization direction 210. In the present exemplary embodiment, the first polarization direction 210 is a horizontal direction and the first liquid crystal arrangement 260 is formed in the horizontal direction so the first image (A) is polarized in the horizontal direction. The first image (A) becomes a first polarization image (A'), which is polarized in the horizontal direction due to the first liquid crystal arrangement 260 of the horizontal direction, when passing through the second liquid crystal layer 150, and the display panel 100 transmits the first polarization image A' to the outside of the display panel 100.

Referring to FIG. 4, in response to a second image (B) passing through the second liquid crystal layer 150, the second liquid crystal layer 150 has the second liquid crystal arrangement 270 so that the second image (B) is polarized in a second polarization direction 220. The second image (B) refers to a next image of the first image (A) of FIG. 3 in response to a 3D image being realized in the active method. In the present exemplary embodiment, the second polarization direction 220 is a vertical direction and the second liquid crystal arrangement 270 is formed in the vertical direction so that the second image (B) is polarized in the vertical direction. The second image (B) becomes a second polarization image (B'), which is polarized in the vertical direction due to the second liquid crystal arrangement 270, when passing through the second liquid crystal layer 150, and the display panel 100 transmits the second polarization image (B') to the outside of the display apparatus.

After the second polarization image (B') is transmitted to the outside, a third image (not shown) passes through the second liquid crystal layer 150. The third image is polarized in the horizontal direction in the same way as the first polarization image (A') of FIG. 3 and is then transmitted to the outside of the display panel 100. After the third image is transmitted to the outside of the display panel 100, a fourth image (not shown) is polarized in the vertical direction in the same way as the second polarization image (B') of FIG. 4 and is then transmitted to the outside of the display panel 100. After that, odd-numbered images such as a fifth image (not shown) and a seventh image (not shown) are polarized in the horizontal direction, and even-numbered images such as a sixth image (not shown) and an eighth image (not shown) are polarized in the vertical direction and are transmitted to the outside of the display panel 100.

As a result, in response to a 3D image being realized, the display panel 100 in the present exemplary embodiment alternately transmits, in a temporal order, the horizontally polarized images and the vertically polarized images to the outside of the display panel.

Figure 5:
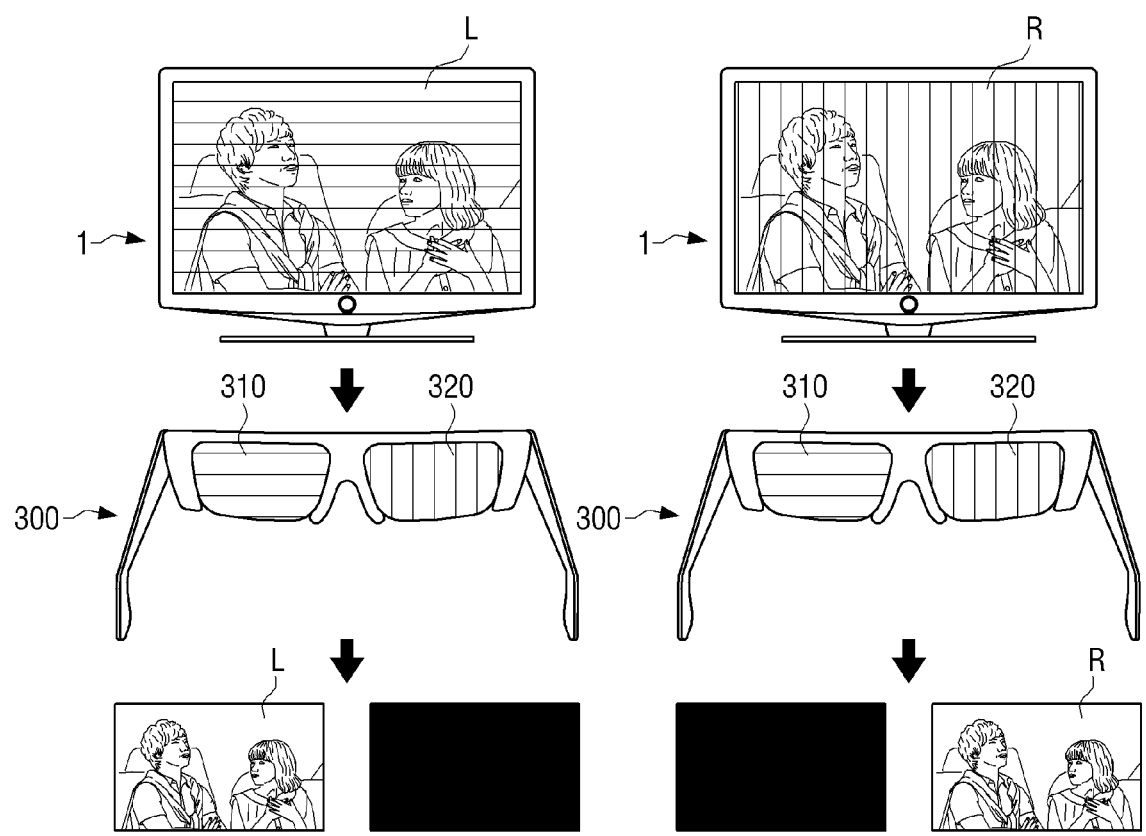
FIG. 5 is a view schematically illustrating a 3D image which is realized by the display apparatus of FIG. 1 and is recognized by a user through polarized glasses.

FIG. 5 is a view schematically illustrating a 3D image which is realized by the display apparatus of FIG. 1 and is recognized by a user through polarized glasses.

Referring to FIG. 5, polarized glasses 300 includes a left glass 310 which allows a horizontally polarized image to pass therethrough and a right glass 320 which allows a vertically polarized image to pass therethrough. A user can recognize a 3D image output from the display apparatus 1, which obtains with the 3D glasses a 3D image in the active method.

Hereinafter, an operation of the polarized glasses 300 will be explained in detail. In response to the display apparatus 1 transmitting a horizontally polarized image (L), the horizontally polarized image (L) passes through only the left glass 310 of the polarized glasses 300. That is, the horizontally polarized image (L) is recognized only by the left eye of the user wearing the polarized glasses 300. After that, in response to the display apparatus 1 transmitting a vertically polarized image (R), the vertically polarized image (R) passes through only the right glass 320 of the polarized glasses 300. That is, the vertically polarized image (R) is recognized by only the right eye of the user wearing the polarized glasses 300. Thereafter, the display apparatus 1 transmits the horizontally polarized image (L) and the vertically polarized image (R) alternately again, and the user wearing the polarized glasses 300 alternately recognizes the horizontally polarized image (L) and the vertically polarized image (R) with his/her left and the right eyes, in the above-described manner.

As described above, according to an exemplary embodiment, the user can recognize the 3D image on the display apparatus 1, which realizes a 3D image in the active method, using the polarized glasses 300 rather than shutter glasses. Therefore, the user can recognize the 3D image of high quality realized in the active method through the polarized glasses, which are light and inexpensive in comparison with the shutter glasses.

Figure 6:
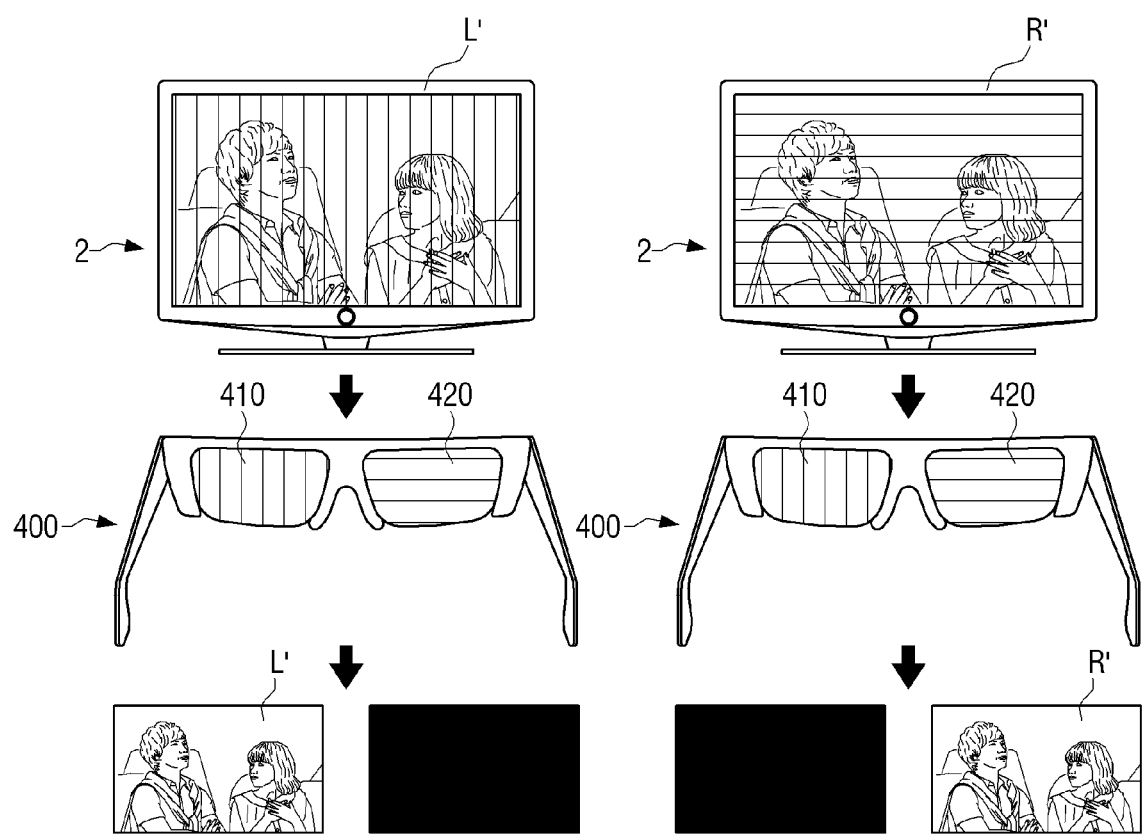
FIG. 6 is a view schematically illustrating a 3D image which is realized by a display apparatus according to another exemplary embodiment and is recognized by a user through polarized glasses.

FIG. 6 is a view schematically illustrating a 3D image which is realized by a display apparatus according to another exemplary embodiment, and is recognized by a user through polarized glasses.

The display apparatus 2 of FIG. 6 is similar to the display apparatus 1 in the aforementioned exemplary embodiment and hereinafter a difference between them will be primarily described.

Referring to FIG. 6, polarized glasses 400 include a left glass 410 to allow a vertically polarized image to pass therethrough and a right glass 420 to allow a horizontally polarized image to pass therethrough. In response to the display apparatus 2 transmitting a vertically polarized image (L'), the vertically polarized image (L') passes only through the left glass 410 of the polarized glasses 400 and is only recognized by the left eye of the user. Thereafter, in response to the display apparatus 2 transmitting a horizontally polarized image (R'), the horizontally polarized image (R') passes only through the right glass 420 of the polarized glasses 400 and is only recognized by the right eye of the user.

In this way, the vertically polarized image (L') and the horizontally polarized image (R') are alternately recognized by the left eye and the right eye of the user wearing the polarized glasses 400, so that the user can recognize a 3D image.

Figure 7:
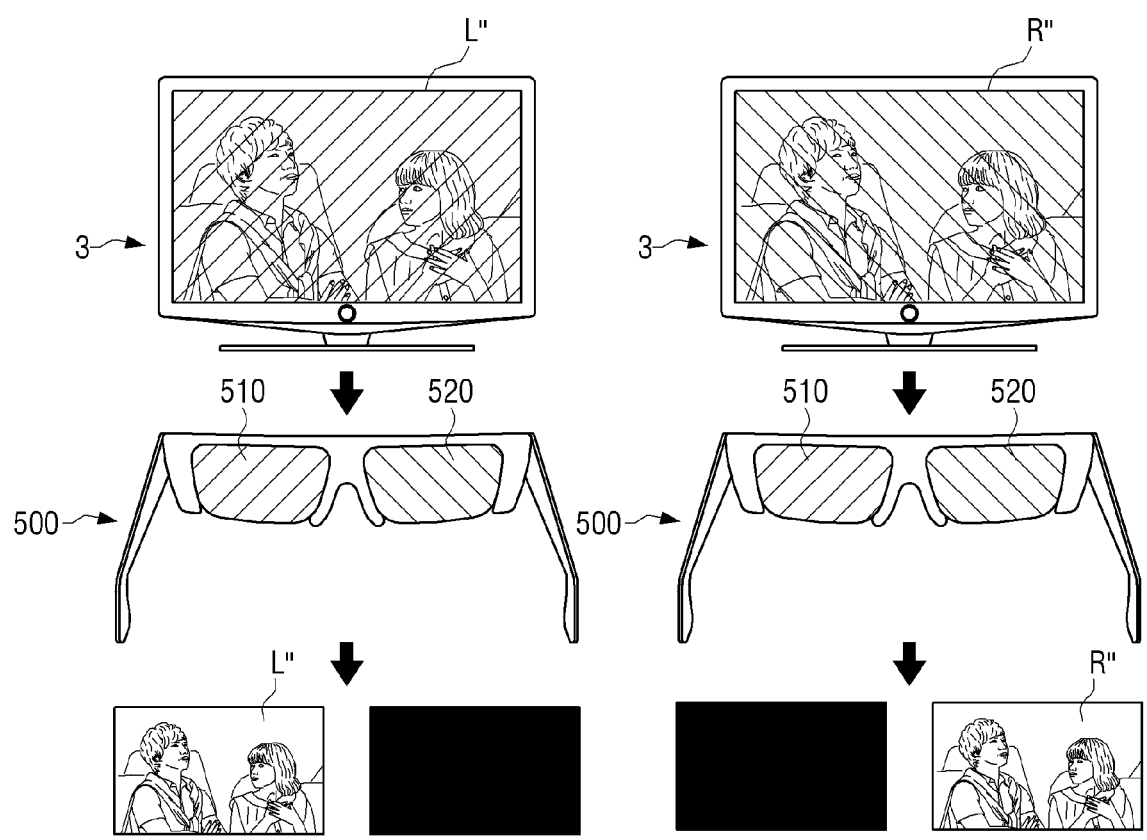
FIG. 7 is a view schematically illustrating a 3D image which is realized by a display apparatus according to still another exemplary embodiment and is recognized by a user through polarized glasses.

FIG. 7 is a view schematically illustrating a 3D image which is realized by a display apparatus according to still another exemplary embodiment, and is recognized by a user through polarized glasses.

The display apparatus 3 of FIG. 7 is similar to the display apparatus 1 in the aforementioned exemplary embodiment and hereinafter a difference between them will be primarily described.

Referring to FIG. 7, polarized glasses 500 include a left glass 510 to allow an image polarized in an oblique direction to pass therethrough and a right glass 520 to allow an image polarized in an oblique direction perpendicular to the oblique direction of the left glass 510 to pass therethrough.

The display apparatus 3 alternately transmits an image (L") polarized in an oblique direction and an image (R") polarized in an oblique direction perpendicular to the prior oblique direction. The images (L" and R") polarized in the oblique directions are formed by passing through a second liquid crystal layer (not shown) of a display panel (not shown)

In response to an image entering the second liquid crystal layer, the second liquid crystal layer arranges liquid crystals in an oblique direction and transmits the image entering the second liquid crystal layer as the image (L") polarized in the oblique direction. In response to a next image entering the second liquid crystal layer, the second liquid crystal layer arranges the liquid crystals in an oblique direction perpendicular to the prior oblique direction and transmits the image as the image (R") polarized in the oblique direction perpendicular to the prior oblique direction. In this manner, the second liquid crystal layer transmits alternately and in sequence the incoming images as the image (L") polarized in the oblique direction and the image (R") polarized in the oblique direction perpendicular to the prior oblique direction.

In response to the display apparatus 3 transmitting the image (L") polarized in the oblique direction, the image (L") polarized in the oblique direction only passes through the left glass 510 of the polarized glasses 500 and is only recognized by the left eye of the user. After that, in response to the display apparatus 3 transmitting the image (R") polarized in the oblique direction perpendicular to the prior oblique direction, the image (R") polarized in the oblique direction perpendicular to the prior oblique direction only passes through the right glass 520 of the polarized glasses 500 and is only recognized by the right eye of the user.

In this manner, the image (L") polarized in the oblique direction and the image (R") polarized in the oblique direction perpendicular to the prior oblique direction are alternately recognized by the left eye and the right eye of the user wearing the polarized glasses 500, so that the user can recognize a 3D image.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display panel which realizes a 3D image in an active method, the display panel comprising:
   a first glass on which light is incident;
   a second glass which is aligned with the first glass and transmits an image;
   a first liquid crystal layer disposed between the first glass and the second glass and adjusts an amount of the light passing therethrough;
   a second liquid crystal layer disposed between the second glass and the first liquid crystal layer and which realizes the 3D image;
   a first TFT array configured to drive the first liquid crystal layer; and
   a second TFT array disposed between the second liquid crystal layer and the first glass, the second TFT array disposed between the first liquid crystal layer and the second liquid crystal layer, and the second TFT array configured to drive the second liquid crystal layer,
   wherein the second TFT array is configured to alternately drive the second liquid crystal layer to a first liquid crystal arrangement which corresponds to a first polarization direction and a second liquid crystal arrangement which corresponds to a second polarization direction different from the first polarization direction, so that images passing through the second liquid crystal layer are alternately polarized in the first polarization direction and the second polarization direction.

2. The display panel as claimed in claim 1, wherein the first polarization direction and the second polarization direction are perpendicular to each other.

3. The display panel as claimed in claim 2, wherein the first polarization direction is a horizontal direction and the second polarization direction is a vertical direction.

4. The display panel as claimed in claim 2, wherein the first polarization direction is a vertical direction and the second polarization direction is a horizontal direction.

5. The display panel as claimed in claim 2, wherein the first polarization direction is an oblique direction and the second polarization direction is an oblique direction which is perpendicular to the first polarization direction.

6. The display panel as claimed in claim 1, further comprising a color filter which is disposed between the first liquid crystal layer and the second liquid crystal layer.

7. The display panel as claimed in claim 6, further comprising:
a first polarization plate which is disposed on a lower portion of the first glass; and
a second polarization plate which is disposed between the second liquid crystal layer and the color filter.

8. The display panel as claimed in claim 7, wherein a polarization axis of the first polarization plate and a polarization axis of the second polarization plate are perpendicular to each other.

9. A display apparatus comprising a display panel according to claim 1, further comprising a backlight and a housing surrounding the display panel and the backlight.

10. A display panel which realizes a 3D image, the display panel comprising:
a first glass;
a second glass which is aligned with the first glass;
a first liquid crystal layer disposed between the first glass and the second glass;
a second liquid crystal layer disposed between the second glass and the first liquid crystal layer;
a first TFT array configured to drive the first liquid crystal layer; and
a second TFT array disposed between the second liquid crystal layer and the first glass, the second TFT array disposed between the first liquid crystal layer and the second liquid crystal layer, and the second TFT array configured to drive the second liquid crystal layer,
wherein the second TFT array is configured to alternately drive the second liquid crystal layer to a first liquid crystal arrangement which corresponds to a first polarization direction and a second liquid crystal arrangement which corresponds to a second polarization direction different from the first polarization direction.

11. The display panel of claim 10, wherein the first crystal layer adjusts the amount of light passing therethrough.

12. The display panel of claim 10 wherein images passing through the second liquid crystal layer are alternately polarized in the first polarization direction and the second polarization direction.

13. The display panel as claimed in claim 10, wherein the first polarization direction and the second polarization direction are perpendicular to each other.

14. The display panel as claimed in claim 13, wherein the first polarization direction is a horizontal direction and the second polarization direction is a vertical direction.

15. The display panel as claimed in claim 13, wherein the first polarization direction is a vertical direction and the second polarization direction is a horizontal direction.

16. The display panel as claimed in claim 13, wherein the first polarization direction is an oblique direction and the second polarization direction is an oblique direction which is perpendicular to the first polarization direction.

17. The display panel as claimed in claim 10, further comprising:
a color filter which is disposed between the first liquid crystal layer and the second liquid crystal layer;
a first polarization plate which is disposed on a lower portion of the first glass; and
a second polarization plate which is disposed between the second liquid crystal layer and the color filter,
wherein a polarization axis of the first polarization plate and a polarization axis of the second polarization plate are perpendicular to each other.

* * * * *